(12) United States Patent  (10) Patent No.: US 11,820,514 B2
Jensen et al.  (45) Date of Patent: Nov. 21, 2023

(54) LEGREST FOR AN AIRCRAFT PASSENGER SEAT, COMPRISING A DEVICE

(71) Applicant: ZIM AIRCRAFT SEATING GMBH, Immenstaad am Bodensee (DE)

(72) Inventors: Alexander Jensen, Friedrichshafen (DE); Marc Dittrich, Amtzell (DE)

(73) Assignee: ZIM AIRCRAFT SEATING GMBH, Immenstaad am Bodensee (DE)

( * ) Notice: Subject to any disclaimer, the term of this patent is extended or adjusted under 35 U.S.C. 154(b) by 0 days.

(21) Appl. No.: 17/822,441

(22) Filed: Aug. 26, 2022

(65) Prior Publication Data

US 2023/0002061 A1    Jan. 5, 2023

Related U.S. Application Data

(63) Continuation of application No. PCT/EP2021/055124, filed on Mar. 2, 2021.

(30) Foreign Application Priority Data

Mar. 5, 2020   (DE) ...................... 10 2020 106 033.5

(51) Int. Cl.
   *B64D 11/06*  (2006.01)
(52) U.S. Cl.
   CPC ...... *B64D 11/0631* (2014.12); *B64D 11/0643* (2014.12)
(58) Field of Classification Search
   CPC .................. B64D 11/0631; B64D 11/0643
   See application file for complete search history.

(56) References Cited

U.S. PATENT DOCUMENTS

| 5,335,882 A | 8/1994 | Bonacci |
| 6,588,839 B1 | 7/2003 | Salzer |
| 9,751,631 B2 | 9/2017 | Marini et al. |
| 2016/0031561 A1 | 2/2016 | Bamford et al. |

(Continued)

FOREIGN PATENT DOCUMENTS

| CN | 102126454 A | 7/2011 |
| CN | 106696781 A | 5/2017 |

(Continued)

OTHER PUBLICATIONS

International Preliminary Report on Patentability (Application No. PCT/EP2021/055124) (with Ch. II Claims) dated Jun. 3, 2022 (with English translation).

(Continued)

*Primary Examiner* — Anthony D Barfield
(74) *Attorney, Agent, or Firm* — BURR PATENT LAW, PLLC (57) ABSTRACT

A legrest for an aircraft passenger seat, comprising a device, wherein: the device has a housing; the housing has a first and a second housing half; the two housing halves are pivotally connected to one another; the housing is designed such that a life jacket for an aircraft passenger can be stowed therein; the device is provided on a main structure of the legrest; the first housing half is spring-loaded with respect to the second housing half by the spring force of a spring device of the device, such that the first housing half can be moved from an open position relative to the second housing half towards a closed position relative to the second housing half.

14 Claims, 6 Drawing Sheets

(56) References Cited

U.S. PATENT DOCUMENTS

| | | |
|---|---|---|
| 2018/0162534 A1 | 6/2018 | Jakubowski et al. |
| 2018/0249833 A1 | 9/2018 | Goetz |
| 2018/0290752 A1 | 10/2018 | Jussli et al. |
| 2019/0031353 A1 | 1/2019 | Texeraud |
| 2019/0077559 A1 | 3/2019 | Lumsden et al. |
| 2019/0233121 A1 | 8/2019 | Wunderlich et al. |
| 2019/0241108 A1 | 8/2019 | Kim et al. |
| 2020/0216179 A1 | 7/2020 | Last et al. |

FOREIGN PATENT DOCUMENTS

| | | |
|---|---|---|
| CN | 109789826 A | 5/2019 |
| DE | 199 44 619 A1 | 4/2001 |
| DE | 10 2015 116 593 A1 | 3/2017 |
| DE | 10 2016 108 288 A1 | 11/2017 |
| EP | 2 965 990 A1 | 1/2016 |
| GB | 2 546 086 A | 7/2017 |
| KR | 19980024167 U  * | 7/1998 |
| WO | 2015/189721 A2 | 12/2015 |
| WO | 2016/184597 A1 | 11/2016 |
| WO | 2017/083894 A1 | 5/2017 |

OTHER PUBLICATIONS

German Search Report (Application No. 10 2020 106 033.5) dated Feb. 23, 2021.
International Search Report and Written Opinion (Application No. PCT/EP2021/055124) dated Jun. 1, 2021 (with English translation).
English translation of Chinese Office Action dated Jan. 18, 2023 (Application No. 202180019102.6).

* cited by examiner

Fig. 12

LEGREST FOR AN AIRCRAFT PASSENGER SEAT, COMPRISING A DEVICE

CROSS REFERENCE TO RELATED APPLICATIONS

This application is a continuation of International Application No. PCT/EP2021/055124 filed Mar. 2, 2021, which designated the United States, and claims the benefit under 35 USC § 119(a)-(d) of German Application No. 10 2020 106 033.5 filed Mar. 5, 2020, the entireties of which are incorporated herein by reference.

FIELD OF THE INVENTION

The present invention relates to a legrest for an aircraft passenger seat, comprising a device.

BACKGROUND OF THE INVENTION

An aircraft passenger seat with an option for accommodating a lifejacket is known. In known aircraft passenger seats, the lifejacket is accommodated under a seat surface of the aircraft passenger seat or under the armrest in a lifejacket receptacle.

A disadvantage of these known locations for accommodating the lifejacket is that, when the lifejacket is accommodated underneath the armrest, for example, stowage space for other components of the aircraft passenger seat, e.g. multimedia components, is restricted or the lifejacket is comparatively difficult to access. For example, it is not possible to access the lifejacket when it is accommodated under the seat surface of the aircraft passenger seat in the case of an aircraft passenger seat with a legrest.

SUMMARY OF THE INVENTION

The present invention is based on the object of providing an improved option for accommodating a lifejacket at an aircraft passenger seat. In particular, the object of providing a device for mounting on the aircraft passenger seat by means of which access to a lifejacket is facilitated and, advantageously, stowage space for further components of the aircraft passenger seat is opened up.

The starting point of the present invention is a legrest for an aircraft passenger seat having a device. For example, the legrest is present in the form of an aircraft passenger seat legrest.

Advantageously, the aircraft passenger seat comprises a movable legrest, which can be pivoted out of a starting position into a rest position and vice versa. It is preferably the case that the legrest in the rest position is pivoted out on the aircraft passenger seat in such a way that an aircraft passenger using the aircraft passenger seat can rest their legs on the legrest.

For example, the aircraft passenger seat comprises a main framework, on which a seat bottom and a backrest of the aircraft passenger seat are arranged. Advantageously, the seat bottom and the backrest are movable in relation to the main framework or to parts of the main framework.

The essence of the present invention can be seen in the fact that the device comprises a housing, wherein the housing has a first and a second housing half, wherein the two housing halves are pivotably movably connected to one another, wherein the housing is designed in such a way that a lifejacket for an aircraft passenger can be stowed therein, wherein the device is arranged on a basic structure of the legrest, wherein the device has a spring device, wherein the first housing half is subjected to a spring force of the spring device with respect to the second housing half, with the result that the first housing half can be moved from an open position relative to the second housing half toward a closed position relative to the second housing half.

For example, the first housing half can be moved relative to the second housing half from an open position toward the closed position by the spring force of the spring device. It is also conceivable for the first housing half to be movable relative to the second housing half from the open position toward the closed position counter to the spring force of the spring device. For example, a movement of the first housing half relative to the second housing half from an open position toward the closed position is a closing movement in a closing direction. For example, a movement of the first housing half relative to the second housing half from the closed position toward an open position is an opening movement in an opening direction.

For example, the aircraft passenger seat comprises a legrest arranged movably on the main framework or on part of the main framework. Advantageously, the basic structure of the legrest is in the form of a frame or a support structure for the legrest. For example, a cushion or upholstery of the legrest can be arranged on the basic structure of the legrest. Advantageously, the basic structure supports the cushion against a force or loading exerted by a user of the aircraft passenger seat. The legrest is preferably movably connected to the rest of the aircraft passenger seat, in particular, to the main framework, in particular, exclusively via the basic structure.

Advantageously, the lifejacket is in the form of an aircraft lifejacket, in particular, an aircraft passenger seat lifejacket. For example, the second housing half comprises a holding device, in order to fix the lifejacket in place in the arranged state on the second housing half. For example, the lifejacket on the second housing half can be clipped or pushed in on the second housing half by the holding device.

A useful surface of the aircraft passenger seat is preferably that surface of the aircraft passenger seat that is in contact with a user or aircraft passenger using the aircraft passenger seat conventionally, e.g. on which they sit or on which they rest or a body part rests, e.g. on which they place or rest their legs.

Advantageously, the housing halves have a fixed, stable and/or rigid form. For example, the housing halves are made from metal and/or a stable plastic. For example, the housing halves are exclusively made from metal and/or a stable plastic.

For example, a cushion and/or a seat cover, e.g. part of the upholstery, can be arranged on the first housing half. For example, the seat cover and/or the cushion can be hooked on by means of a hook-and-eye tape, what is referred to as a hook-and-loop tape. It is also conceivable for the seat cover and/or the cushion to be adhesively bonded or clamped on the first housing half. Advantageously, the seat cover and/or the cushion can be arranged detachably on the first housing half. It is also conceivable that the first housing half, in particular, the device, directly has or forms a seat cover and/or a cushion.

Advantageously, the device is arranged on the legrest at an upholstered location on the legrest. For example, the device is arranged on the legrest next to a cushion and/or between cushions of the legrest. Advantageously, in addition to the device and, for example, in addition to the upholstery elements of the cushion that are arranged on the device, the legrest comprises further upholstery elements. Advantageously, the further upholstery elements together with the upholstery elements on the device form a cushion or upholstery of the legrest.

Advantageously, there is a single closed position of the two housing halves relative to one another. For example, the two housing halves in the closed position have been fully pivoted or rotated toward one another about a pivot pin in a closing direction. It is also conceivable for there to be a first closed position, in which the two housing halves have been moved toward one another and can be fixed in place relative to one another in the first closed position by means of a closure mechanism. It is furthermore conceivable for there to be a second closed position, wherein the first housing half is pivoted from the first closed position into the second closed position in a closing direction. This makes it possible, for example, to implement a push-latch mechanism for opening the housing.

There are preferably a multiplicity of open positions of the two housing halves in relation to one another. In particular, there is a single open position, i.e. the fully open position, in which the two housing halves are fully pivoted away from one another. For example, the device comprises a stop member, against which one of the two housing halves, in particular, the first housing half, comes up in the fully open position.

It is moreover proposed that the two housing halves are non-detachably connected to one another. This makes it possible to reliably and securely open the device in an emergency when the user needs to access the lifejacket. This likewise makes it possible to comparatively securely accommodate the lifejacket in the device, which accommodation comparatively securely protects the lifejacket, e.g. against unauthorized access.

It has also proven advantageous for the spring device to have two spring elements. This makes it possible to implement redundancy of the spring device. Moreover, this avoids tilting of the housing halves when the housing halves are being moved relative to one another.

Advantageously, the spring device comprises precisely two spring elements. For example, one spring element is in the form of a spring, e.g. a leg spring and/or a helical spring. Advantageously, the spring elements of the spring device are spaced apart from one another on the device.

It has moreover proven to be advantageous for each housing half to have a main side element, wherein side elements protruding transversely in relation thereto are present on each of the main side elements, wherein two side elements of one main side element are spaced apart from one another and are situated opposite one another, wherein a spacing between the two spaced-apart and oppositely situated side elements of the first housing half is greater than a spacing between the two spaced-apart and oppositely situated side elements of the second housing half, such that the side elements of the first and the second housing half overlap in a closed position of the first housing half. This makes it possible to arrange the lifejacket advantageously inaccessibly in the interior of the housing in the closed position of the housing. For example, as a result the housing is comparatively stable, such that no object can be introduced into the housing in the closed position of the housing. The two housing halves preferably enclose the interior of the housing in the closed position. Advantageously, the two housing halves form a cavity in the interior in the closed position. Advantageously, the lifejacket can be accommodated in the cavity in the housing. For example, the main side elements and the side elements of the housing halves enclose the interior, in particular the cavity, in the closed position.

Advantageously, the main side elements and the side elements of the housing halves enclose the interior, in particular the cavity, completely in the closed position.

Advantageously, four side elements are present on each housing half. For example, the side elements are arranged in a rectangle. Advantageously, two respective side elements of one housing half are connected to one another directly, for example. Advantageously, each housing half is in the form of a half-shell or is half-shell-shaped.

It is preferably the case that the main side element of the second housing half, in particular, rests directly on the basic structure of the legrest. It is also conceivable for the basic structure of the legrest to form the main side element of the second housing half. For example, the second housing half, in particular, the main side element of the second housing half, is riveted, welded, soldered or adhesively bonded to the basic structure.

The first housing half and the second housing half are preferably connected to one another by means of a pivot bearing. For example, a side element of the first housing half is connected to a side element of the second housing half by means of the pivot bearing. It is conceivable for the pivot bearing to have a single pivot bearing pin, which extends from a side element of the first housing half to a further side element, spaced apart from and situated opposite the side element, of the first housing half.

Advantageously, two pivot bearings are present, wherein each pivot bearing comprises a pivot bearing pin, wherein the two pivot bearing pins form a common pivot axis. For example, the two pivot bearings are spaced apart from one another. It is preferably the case that a first pivot bearing of the two pivot bearings connects a first side element of the first housing half to a first side element of the second housing half, and a second pivot bearing of the two pivot bearings connects a second side element of the first housing half to a second side element of the second housing half. For example, the first and second side elements of the first and second housing halves are each spaced apart from and situated opposite one another.

The spring device is preferably present in the region of the pivot bearing. It is conceivable for the spring device to be formed on the pivot bearing. For example, a spring element encloses the pivot bearing pin of the pivot bearing. It is furthermore conceivable for the spring element to be supported by way of a first end on the first housing half and by way of a second end e.g. on the second housing half, with the result that the two housing halves are subjected to a spring force of the spring element in at least one relative position with respect to one another. It is also conceivable for the spring element to be supported by way of its second end on the basic structure in addition or as an alternative to being supported on the second housing half. For example, the spring element is supported by way of the first end on the main side element and/or on a side element of the first housing half and by way of the second end on the main side element of the second housing half and/or on a side element of the second housing half and/or on the basic structure of the legrest. Advantageously, the spring element is positionally fixedly connected by way of its first end to the main side element and/or to a side element of the first housing half. For example, the spring element is positionally fixedly connected by way of its second end to the main side element of the second housing half and/or to the side element of the second housing half and/or to the basic structure of the legrest. For example, one end of the spring element is clipped and/or clamped and/or welded and/or adhesively bonded on one of the preceding elements of the device.

It has furthermore proven to be advantageous for the device to have a closure mechanism, wherein the closure mechanism fixes the two housing halves in place in relation to one another in the closed position, wherein the closure mechanism comprises a pulling element, wherein the closure mechanism is designed in such a way that, by pulling on the pulling element, parts of the closure mechanism are moved in such a way that the housing halves are detached from one another in the region of the closure mechanism. By pulling on the pulling element, it becomes possible to move the first housing half relative to the second housing half from the closed state into an open state.

For example, the pulling element is flexible. It is conceivable for the pulling element to be in the form of a cord or a strap. For example, the pulling element is in the form of a fabric strap or a plastic strap. For example, the pulling element has been guided through a through-opening in the main side element of the first housing half.

Moreover, it has proven advantageous for the main side element of the second housing half to be an integral component of the basic structure of the legrest. This simplifies the production and/or mounting of the legrest. Advantageously, the device is arranged directly on the basic structure of the legrest. For example, the device is an integral component or parts of the device are integral components of the basic structure of the legrest.

Advantageously, the side elements of the second housing half are arranged, in particular, directly on the basic structure of the legrest in the arranged state of the device. For example, the side elements of the second housing half are connected non-detachably to the basic structure, e.g. are integral with the basic structure. It is also conceivable for the side elements of the second housing half to be adhesively bonded, screwed and/or riveted on to the basic structure. For example, the second housing half is, in particular, non-detachably connected to the basic structure of the legrest.

An advantageous modification of the legrest is that, in the closed position of the first housing half, the spring force of the spring device urges the first housing half toward an open position of the first housing half relative to the second housing half. This makes it possible to realize an automatic opening movement of the housing.

For example, the spring force of the spring device urges the first housing half from the closed position relative to the second housing half through a pivoting range of between 5° and 25° into a, in particular, first, open position relative to the second housing half, e.g. when the closure mechanism is released.

A further conceivable embodiment of the legrest is that, in the closed position of the first housing half relative to the second housing half, the spring force of the spring device urges the first housing half toward the closed position of the first housing half relative to the second housing half, with the result that the spring force of the spring device counteracts a movement force for moving the first housing half from the closed position into an open position relative to the second housing half. As a result, the device is designed in such a way that the two housing halves advantageously are kept in the closed position or, in particular, are moved automatically into the closed position by means of the spring force. Advantageously, this frees up a movement range in the region of the legrest, in particular, in the event of an evacuation. For example, such a design of the legrest comparatively minimizes a tripping hazard owing to the first housing half being in the open position relative to the second housing half.

Advantageously, the device is designed in such a way that, when the closure mechanism is released, the first housing half can be moved from the closed position into an open position relative to the second housing half by a force exerted by a user. For example, the first housing half can be moved from the closed position into an open position relative to the second housing half by a force exerted by a user counter to the spring force of the spring device.

It has likewise proven to be advantageous for, in an open position of the first housing half, the spring force of the spring device to urge the first housing half toward the closed position of the first housing half relative to the second housing half. In each open position of the first housing half, the spring force of the spring device preferably urges the first housing half toward the closed position. Advantageously, the spring device is present such that the spring device moves the first housing half from an open position, in particular, out of any open position, into the closed position owing to its spring force.

It is furthermore proposed that the spring force of the spring device urges the first housing half from a second open position relative to the second housing half toward the closed position of the first housing half into a first open position. When the closure mechanism is released, this allows a user to access an object in the interior of the housing, while at the same time minimizing a tripping hazard.

Advantageously, it is possible to define an opening range which defines a pivoted state of the first housing half relative to the second housing half in an opening direction starting from the closed position. In the closed position, the opening range is advantageously 0° and assumes a positive value in an opening direction. For example, the first housing half is pivotable relative to the second housing half starting from the closed position in an opening direction through an opening range or through an angular range of up to 45° or 50°, e.g. as far as the fully open position. It is conceivable for the first or the second open position to be in the form of a range in which the first housing half can be pivoted relative to the second housing half.

In the first open position, the first housing half is preferably pivoted away relative to the second housing half in an opening range of 15° to 30° from the closed position. It is conceivable, in the first open position, for the first housing half to be pivoted away relative to the second housing half in an opening range of 15° to 25°, in an opening range of 15° to 20° or in an opening range of 20° to 25° from the closed position. For example, in the first open position the first housing half is pivoted away from the closed position relative to the second housing half through an angular range of 15°, 20°, 25° or 30°.

Advantageously, in the second open position, the first housing half is pivoted away relative to the second housing half in an opening range of 30° to 50° from the closed position. It is conceivable, in the second open position, for the first housing half to be pivoted away relative to the second housing half in an opening range of 30° to 45°, in an opening range of 30° to 40°, in an opening range of 35° to 45° or in an opening range of 35° to 40° from the closed position. For example, in the second open position the first housing half is pivoted away from the closed position relative to the second housing half through an angular range of 30°, 35°, 40°, 45° or 50°.

Advantageously, the device, in particular, the second housing half and/or the basic structure, comprises a stop member, against which a stop element of the first housing half comes up in an open position. Advantageously, in the state in which it has come to a stop or come up against the stop member, the first housing half is in the fully open position relative to the second housing half. For example, the stop member and/or the stop element defines the fully open position.

It has also proven to be advantageous for the spring device to be designed in such a way that the first housing half can be brought, in particular, from the fully open position, toward the closed position by means of the spring force, wherein the spring device is present such that the first housing half does not reach the closed position owing to the spring force of the spring device and/or the first housing half cannot be moved into the closed position from an open position by means of the spring force of the spring device.

In an advantageous embodiment of the legrest, the spring device is designed and arranged on the device in such a way that the spring device moves the first housing half from the closed position relative to the second housing half in an opening direction into an open position, e.g. into the first open position, owing to the spring force of the spring device and wherein the spring device moves the first housing half out of the second open position relative to the second housing half into a further open position, e.g. into the first open position, owing to the spring force of the spring device. It is conceivable for the first housing half to be subjected to the spring force of the spring device both in the closed position and in the second open position. It is furthermore conceivable that no spring force of the spring device acts on the first housing half in the first open position.

However, it is also conceivable for the spring device to be designed in such a way that the first housing half can be moved from an open position, e.g. from the fully open position, completely into the closed position in a closing direction by means of the spring force.

The first housing half preferably comprises a through-opening, with the result that a visible element can be brought out of an interior of the housing through the through-opening. This makes it possible for the visible element to be visible to an observer from the outside, without opening the housing. Advantageously, the device comprises a fixing member, in order to fix the visible element in place on the housing in the guided-through state at the through-opening. The through-opening is in the form of a slot, for example. It is also conceivable for a triggering strap for a closure mechanism of the housing to be able to be brought out through the through-opening.

Advantageously, the visible element comprises information. For example, the information is a color marking, e.g. a color that comprises the visible element. However, it is also conceivable for the visible element to comprise information in the form of a logo and/or a sticker. The information comprises, for example, a datum, e.g. a datum on the logo and/or on the sticker. It is furthermore conceivable for the information to be in the form of a barcode.

The visible element is preferably a constituent part of an object that can be accommodated in the interior of the device or in the interior of the housing, e.g. the lifejacket. Advantageously, the visible element is connected non-detachably to the object, e.g. the lifejacket, and/or to a packaging of the object. For example, the visible element is in the form of a label.

For example, the device has an information mechanism, wherein it is possible to attach information about what is located in the interior of the housing of the device to the information mechanism. The information is an expiry date, for example. The information is in the form of a color marking on the information mechanism, for example. For example, the information mechanism is in the form of a viewing window. It is conceivable for the visible element to comprise the information.

It is also advantageous for the device to have a sealing mechanism, so that a seal can be attached to the device. Advantageously, the seal can be attached to the device in the closed position of the housing. For example, the housing is designed in a way that, in the arranged state of the seal, by moving the two housing halves relative to one another from the closed position into an open position, the seal is destroyed or the seal prevents opening of the housing. Advantageously, the sealing mechanism comprises two securing elements which can be connected to one another by the seal in the closed position of the housing. A securing element comprises an eye, for example. For example, the securing elements can be arranged protruding from the housing or from the legrest in the manner of flags. For example, a first one of the securing elements can be, in particular, non-detachably arranged, e.g. adhesively bonded, screwed and/or riveted, on the first housing half. It has also proven to be advantageous for a second securing element of the sealing mechanism to be e.g. non-detachably arranged on the basic structure of the legrest. For example, the second securing element is adhesively bonded, screwed and/or riveted on the basic structure. For example, the second securing element is arranged directly on the basic structure.

One advantageous embodiment of the present invention is an aircraft passenger seat having a legrest according to one of the variants mentioned above. Advantageously, the legrest is pivotably movable on the aircraft passenger seat.

A further advantageous modification of the present invention is a seat row having at least two aircraft passenger seats as mentioned above.

A further advantageous embodiment of the present invention is an aircraft having an aircraft passenger seat or having a seat row or having a legrest according to one of the variants mentioned above.

BRIEF DESCRIPTION OF THE DRAWINGS

An exemplary embodiment will be explained in more detail on the basis of the following schematic drawings and specifying further details and advantages.

DETAILED DESCRIPTION OF THE INVENTION

Figure 1:
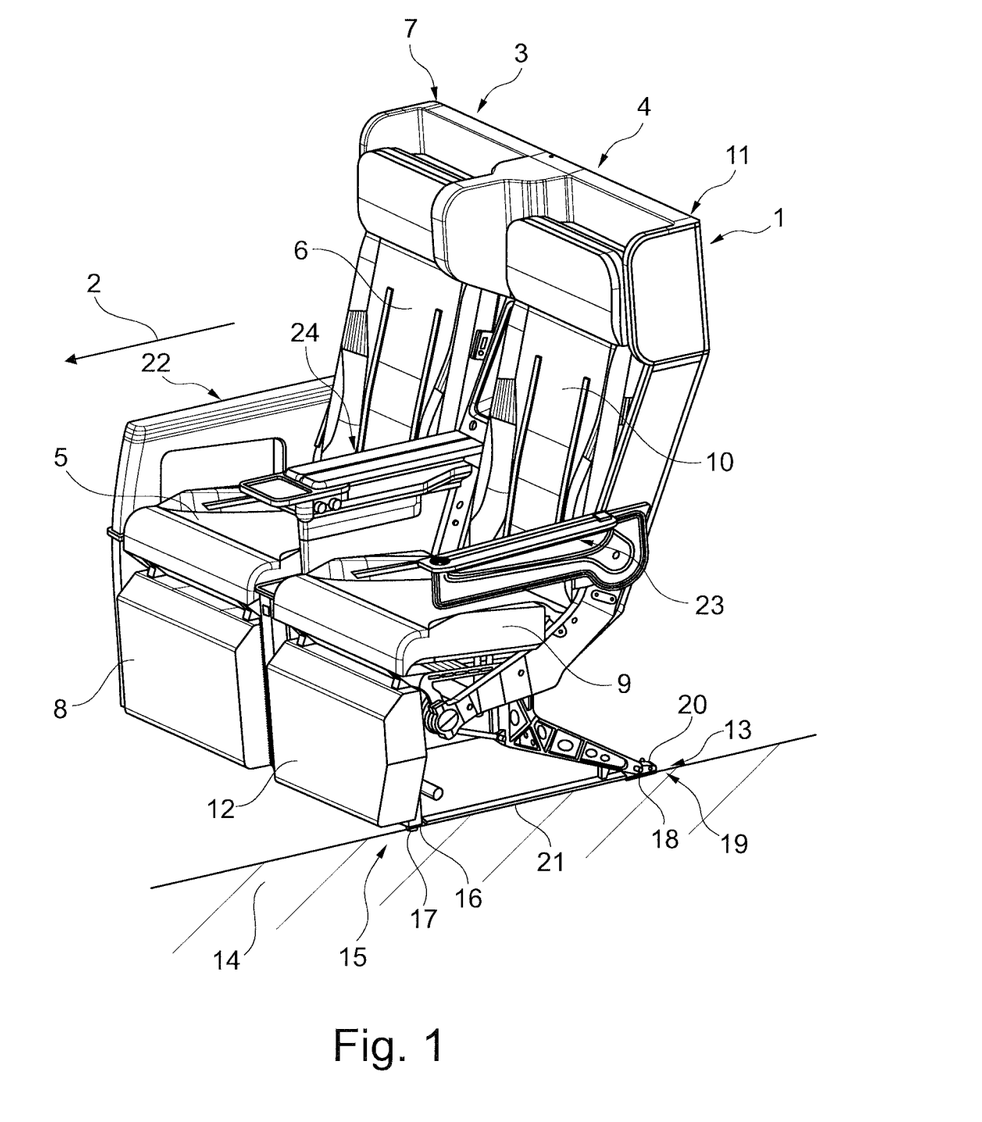
FIG. 1 shows a perspective view obliquely from the front and above of a seat row with two aircraft passenger seats each comprising a seat bottom, a backrest including a back-side enclosure and a legrest.

FIG. 1 shows a seat row 1 with a seat direction 2 having two aircraft passenger seats 3 and 4. In the following text, positional and directional indications such as front, rear, above and below relate to the seat direction 2 and the use state of the seat row 1.

The two aircraft passenger seats 3 and 4 have corresponding structures. The aircraft passenger seat 3 has a seat bottom 5, a backrest 6 and an enclosure 7 which is at the back in relation to the backrest 6. Following a front end region of the seat bottom 5 is a preferably foldable or pivotable legrest 8, which can be folded about a horizontal axis.

Accordingly, the aircraft passenger seat 4 comprises a seat bottom 9, a backrest 10, an enclosure 11 and a legrest 12.

The seat bottoms 5, 9, the backrests 6, 10 and the legrests 8, 12 comprise preferably ergonomically shaped upholstery.

For example, the aircraft passenger seats 3 and 4 can be mounted on a cabin floor 14 of an aircraft cabin of an associated aircraft (not shown) via two supporting legs (only one of which can be seen). For this purpose, the supporting leg 13 has a mounting point 17 on a lower end region 15 of a front strut 16 and a further mounting point 18 on a lower end region 19 of a rear strut 20. A bracing element 21 is provided between the end regions 15 and 19.

The seat row 1 preferably also has an external armrest 22 on the side of the aircraft passenger seat 3 and an external armrest 23 on the side of the aircraft passenger seat 4. A bracket 24, which can likewise be used as an armrest by an aircraft passenger, is present between the two aircraft passenger seats 3 and 4, preferably at the height of the two external armrests 22 and 23.

Advantageously, the respectively associated backrest 6 and 10 is arranged in a shell shape of the respective enclosure 7 and 11, respectively. For the purpose of setting different tilt positions, the backrest 6 and 10 is preferably movably guided in the enclosure 7 and 11, respectively, for example, together with the associated seat bottoms 5 and 9, respectively, which are mounted displaceably.

The aircraft passenger seats 3, 4 shown in FIG. 1 preferably comprise the legrests with a device that are shown in the following FIGS. 2 to 12 and described below.

Figure 2:
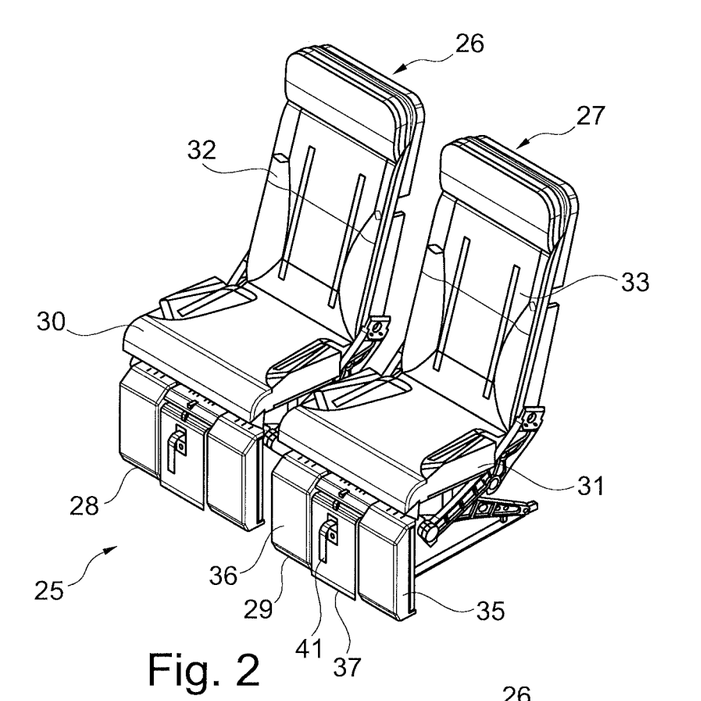
FIGS. 2 to 5 show different perspective views obliquely from the front and above of a further seat row with two aircraft passenger seats having a legrest according to the present invention in various legrest positions.
Figure 3:
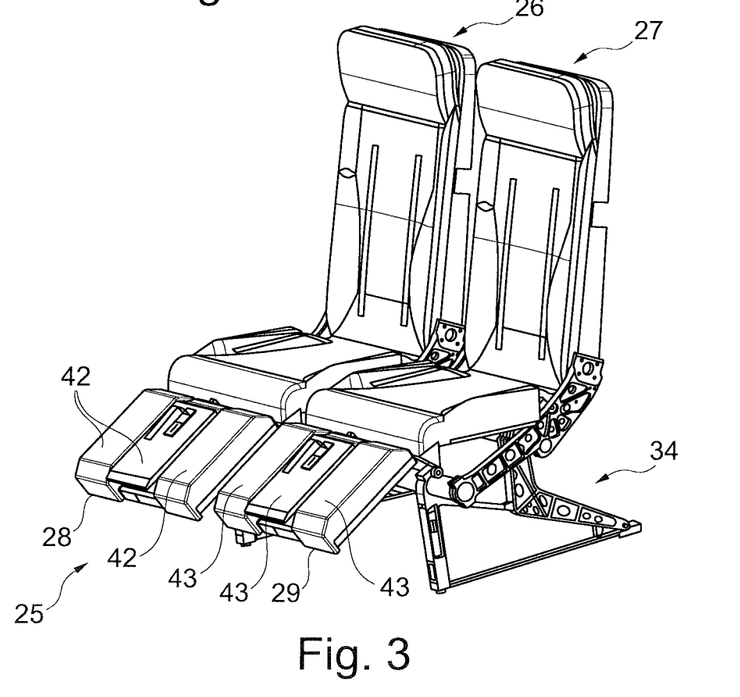
Figure 4:
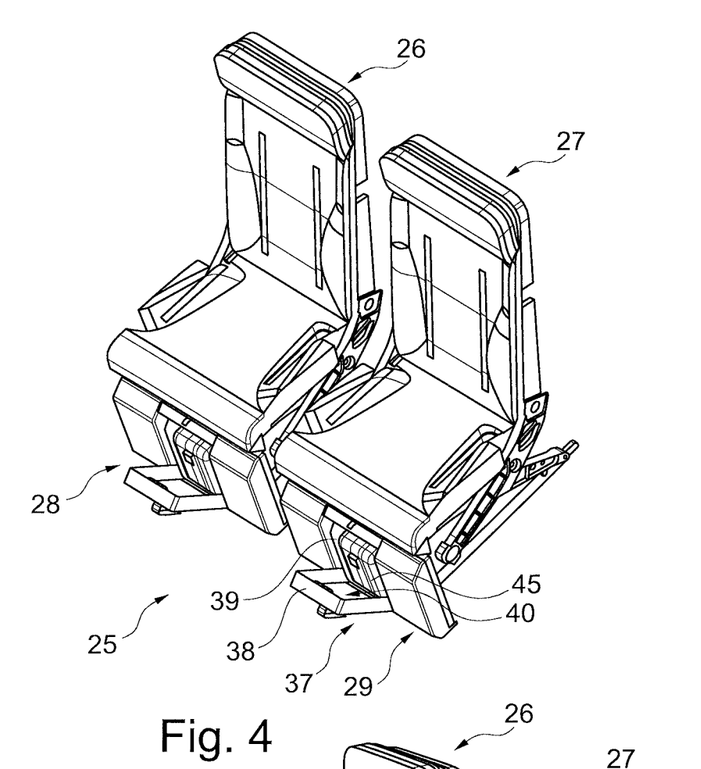

FIGS. 2 to 4 show a further seat row 25 with aircraft passenger seats 26, 27. Advantageously, the seat row 25 corresponds to the seat row 1, the aircraft passenger seats 26, 27 of the seat row 25 differing from the aircraft passenger seats 3, 4 of the seat row 1 exclusively in terms of a different configuration of the legrests 28, 29 of the aircraft passenger seats 26, 27, for example. For example, in FIGS. 2 to 4, the enclosure and the armrests and the bracket are omitted correspondingly for the seat row 25 as for the seat row 1.

Advantageously, the aircraft passenger seats 26, 27 of the seat row 25 respectively comprise a legrest 28, 29, a seat bottom 30, 31, a backrest 32, 33, and supporting legs 34 (only one supporting leg is shown in the figures).

Advantageously, the legrests 28, 29 have identical structures, which is why the structure of the legrests 28, 29 will be described by way of example for the legrest 29 below.

The legrest 29 advantageously comprises a first lateral cushion 35 and a second lateral cushion 36, and also a device 37, among other things. The device 37 comprises a first housing half 38 and a second housing half (see also FIG. 5).

In FIGS. 2 to 5, the legrests 28, 29 are shown in different states at the aircraft passenger seats 26, 27. FIG. 2 shows the legrests 28, 29 in a folded-in legrest state at the aircraft passenger seats 26, 27. In the folded-in legrest state of the legrests 28, 29, the aircraft passenger seats 26, 27 are in an upright use state. FIG. 3 shows the legrests 28, 29 in a folded-out legrest state at the aircraft passenger seats 26, 27. In the folded-out legrest state of the legrests 28, 29, the aircraft passenger seats 26, 27 are in a reclining state. In the reclining state, a user of one of the aircraft passenger seats 26, 27 can rest or place their legs on a useful surface 42, 43 of the legrests 28, 29.

Figure 5:
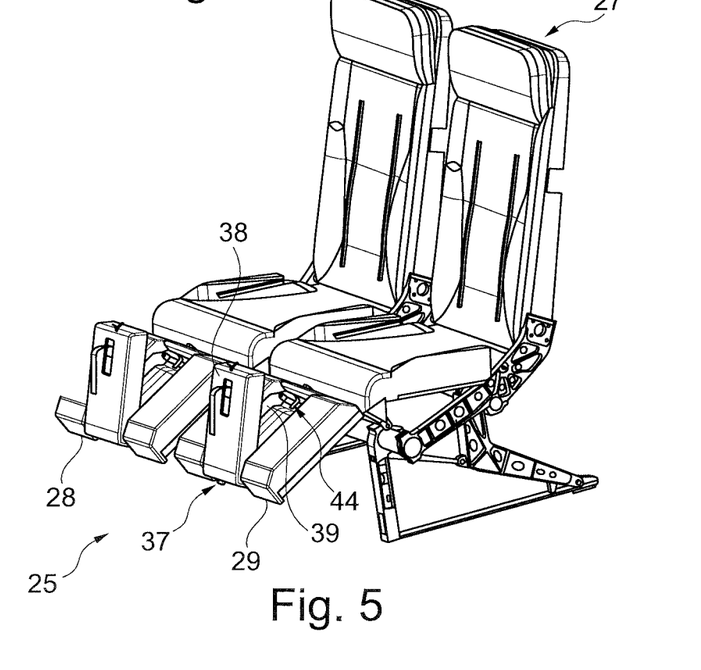

FIG. 4 illustrates the legrest 29 in the folded-in legrest state at the aircraft passenger seat 27 and FIG. 5 illustrates the legrest 29 in the folded-out legrest state at the aircraft passenger seat 27, in each case the first housing half 38 of the device 37 being in an open position relative to the second housing half 39. Also shown is that a lifejacket 45 is arranged in an inner cavity 44 of the device 37.

FIGS. 6 to 9 show the legrest 29 of the aircraft passenger seat 27 in different perspective views.

Figure 6:
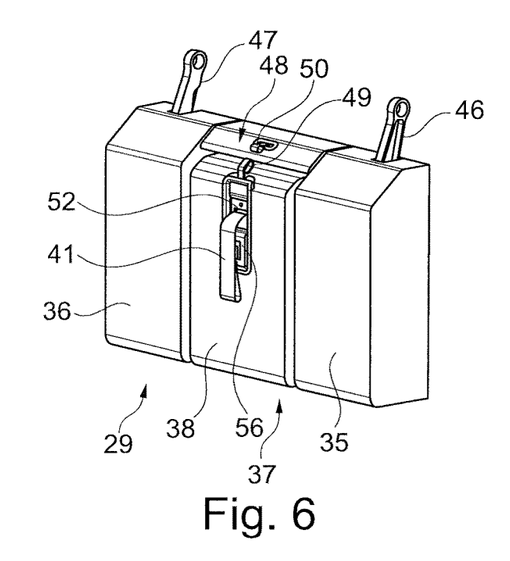
FIGS. 6 to 9 show different perspective views obliquely from the front of a legrest, a first housing half of a device of the legrest being in various states relative to a second housing half.
Figure 7:
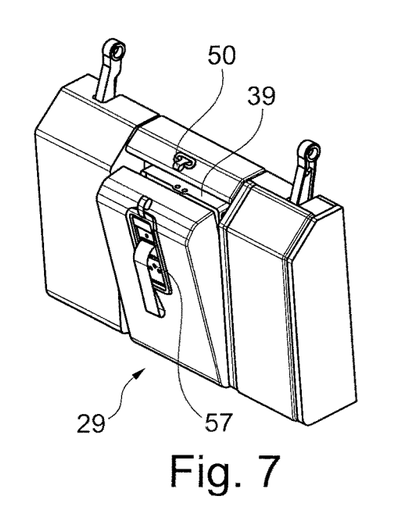
Figures 8, 9:
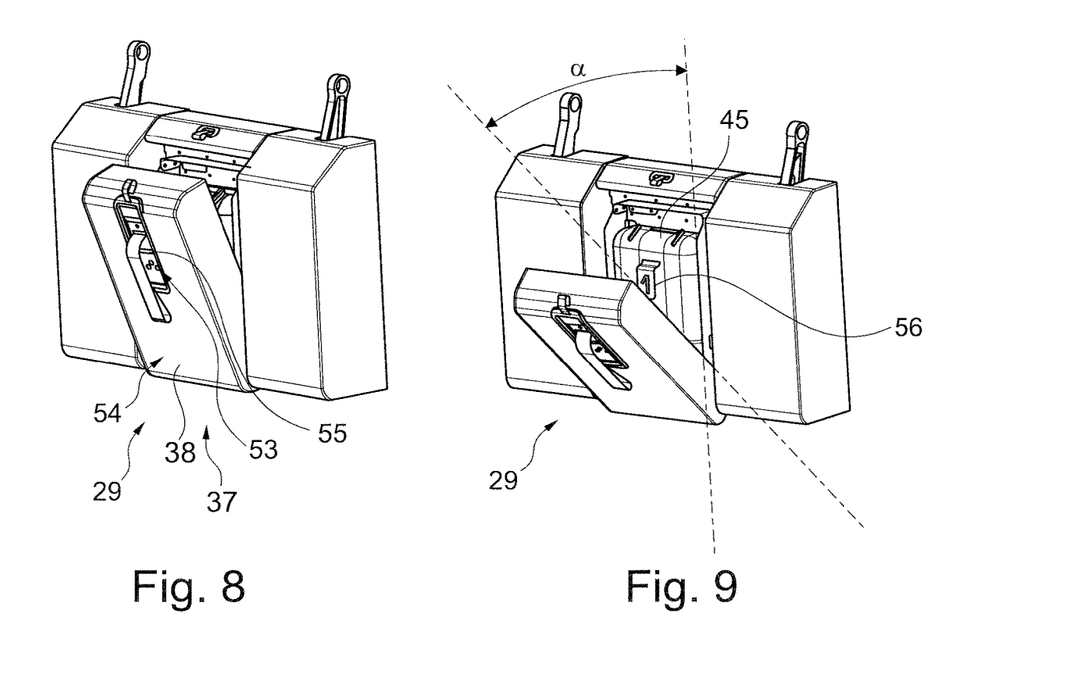

FIG. 6 shows the legrest 29, which comprises the device 37 with the first housing half 38 and the second housing half 39. The legrest 29 also comprises the cushions 35, 36 and two attachment members 46, 47, by means of which the legrest 29 can be pivotably movably arranged on the rest of the aircraft passenger seat 27. Advantageously, on the first housing half 38 the device 37 comprises a pulling element of a closure mechanism 40, for example in the form of a tab 41. For example, the first housing half 38 comprises a through-opening in the form of a slot 52. Advantageously, the tab 41 has been guided through the slot 52 starting from a rear side of the first housing half 38, which delimits the cavity 44. This makes it possible for a user to trigger, in particular open, the closure mechanism 40 by pulling on the tab 41.

A sealing device 48 is preferably also present on the device 37. Advantageously, the sealing device 48 has a first eye 49 and a second eye 50, which can be connected to a seal (not illustrated) in the closed position of the housing halves 38, 39, as shown in FIG. 6. Advantageously, the first eye 49 is fastened to the first housing half 38. For example, the second eye 50 is fastened to the legrest 29, in particular a basic structure 51 of the legrest 29 (see also FIGS. 10, 11).

Advantageously, the device 37 comprises an information mechanism in the form of a cutout 53. For example, the cutout 53 is formed in an outer side 54 of the first housing half 38. For example, the cutout 53 is recessed in the outer side 54, in particular, toward the cavity 44 or toward the second housing half 39. Advantageously, the cutout 53 is recessed in relation to the useful surface 43 of the first housing half 38. It is furthermore advantageous for the information mechanism to have a second through-opening in the form of a second slot 55. For example, a visible element 56 of the lifejacket 45 can be guided through the second slot 55, with the result that the visible element 56 is present in the cutout 53 in the closed position of the first housing half 38 relative to the second housing half 39. For example, the information mechanism comprises a fixing member 57, in order to fix the visible element 56 in place in the cutout 53.

The first housing half 38 is preferably pivotable relative to the second housing half 39 through an angular range a from the closed position into an open position (see also FIG. 9), or vice versa. The angle α is advantageously 0° in the closed position of the first housing half 38 relative to the second housing half 39.

Figure 10:
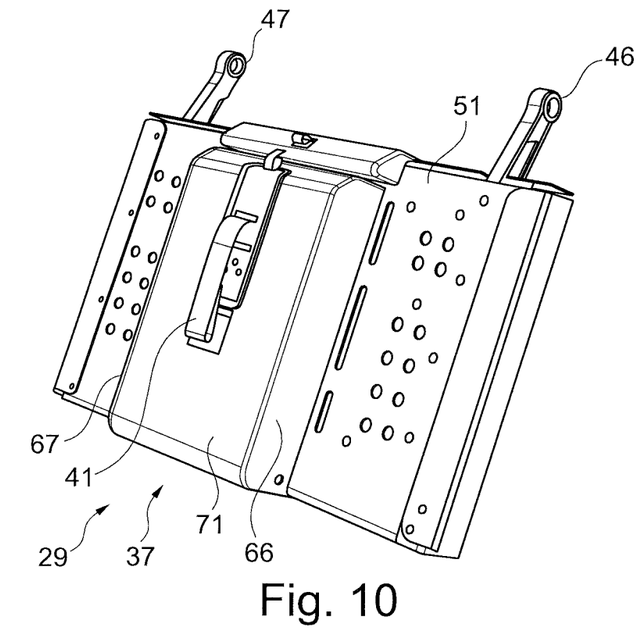
FIG. 10 shows a perspective view obliquely from the front of the legrest according to FIG. 6, with lateral upholstery of the legrest being omitted.

FIG. 10 shows the legrest 29, the cushions 35 and 36 being omitted. The lifejacket 45 is likewise not shown in FIG. 10. FIG. 10 shows that the legrest 29 comprises the basic structure 51, to which the attachment members 46, 47 are fastened. The basic structure 51 advantageously has a plate-shaped design, for example, is in the form of a metal plate.

Figure 11:
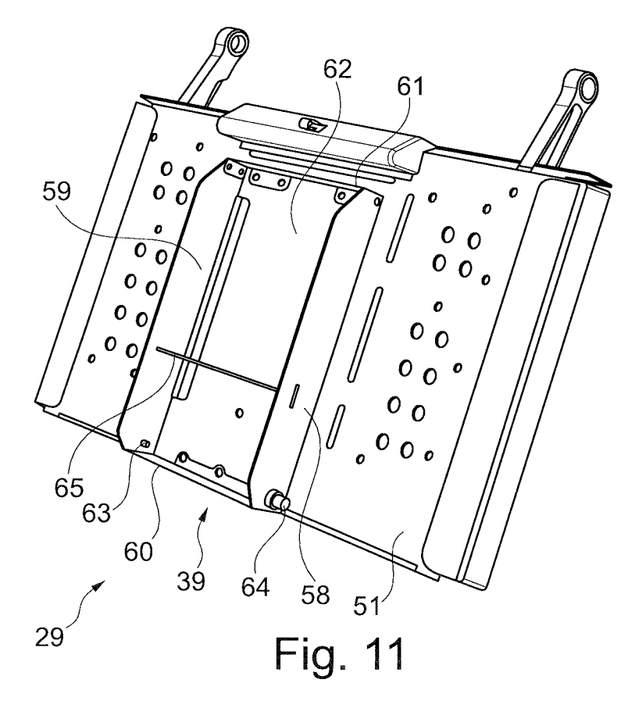
FIG. 11 shows a perspective view obliquely from the front of the legrest according to FIG. 10, with the first housing half with cushions additionally being omitted.

FIG. 11 corresponds to the legrest 29 according to FIG. 10, the first housing half 38 being omitted in FIG. 11. FIG. 11 shows the basic structure 51 of the legrest 29, the second housing half 39 being fastened to the basic structure 51. The second housing half 39 comprises two long side elements 58, 59 and two short side elements 60, 61. Advantageously, the side elements 58 to 61 are directly fastened, e.g. screwed on or riveted on, to the basic structure 51. For example, in this respect the basic structure 51 forms a main side element 62 of the second housing half 39. For example, two pivot bearing pins 63, 64 are present on the second housing half 39. The first housing half 38 can be pivotably connected to the second housing half 39 by means of the pivot bearing pins 63, 64, for example. Advantageously, a pivot bearing pin 63 is formed on a long side element 59 and the other pivot bearing pin 64 is formed on the other long side element 58. For example, the second housing half 39 comprises a holding member in the form of a transverse yoke 65, which extends between and is arranged on the two long side elements 58, 59. Advantageously, a lifejacket arranged on the second housing half 39 is held on the second housing half 39 by means of the transverse yoke 65, and this prevents the lifejacket from inadvertently falling out of the device 37.

Figure 12:
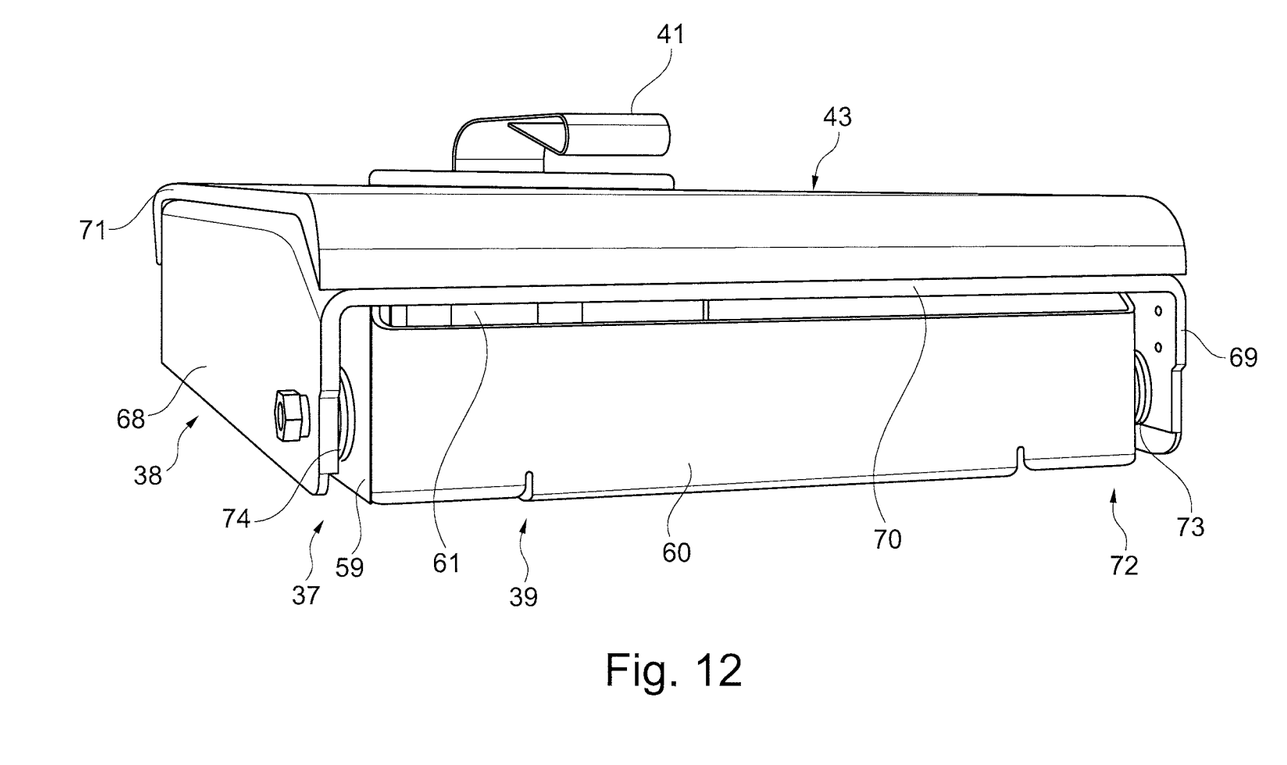
FIG. 12 shows a perspective view obliquely from the side and below of the device of the legrest according to FIG. 10, with the basic structure of the legrest and lateral upholstery of the device being omitted.

FIG. 12 illustrates the device 37 without the rest of the parts of the legrest 29. Therefore, the basic structure 51 and thus the main side element 62, among other things, are not illustrated in FIG. 12. Lateral upholstery elements 66, 67 of the first housing half 38 are likewise not shown (see also FIG. 10). FIG. 12 shows the second housing half 39 with the short side element 60 and the long side element 59. FIG. 12 also shows the first housing half 38, which comprises a first long side element 68 and a second long side element 69, and a main side element 70. Advantageously, the long side elements 68, 69 and the main side element 70 of the first housing half 38 are in one piece. The upholstery elements 66, 67 (see FIG. 10) are fastened to the long side elements 68, 69 in the arranged state on the legrests 29. Advantageously, a further upholstery element 71 is fastened to the main side element 70.

For example, the device 37 comprises a spring device 72, which has spring elements 73 and 74. The spring elements 73, 74 are arranged on the pivot bearing pins 63 and 64, respectively, for example. Advantageously, the spring elements 73, 74 are present between a side element 58 or 59, respectively, of the first housing half and a side element 68 or 69, respectively, of the first housing half 38. For example, the first housing half 38 is pivotably movably articulated on the long side elements 59 of the second housing half 39.

LIST OF REFERENCE SIGNS

1 Seat row
2 Seat direction
3-4 Aircraft passenger seat
5, 9 Seat bottom
6, 10 Backrest
7 Enclosure
8, 12 Legrest
11 Enclosure
13 Supporting leg
14 Cabin floor
15, 19 End region
16, 20 Strut
17-18 Mounting point
21 Bracing element
22-23 Armrest
24 Bracket
25 Seat row
26-27 Aircraft passenger seat
28-29 Legrest
30-31 Seat bottom
32-33 Backrest
34 Supporting leg
35-36 Cushion
37 Apparatus
38-39 Housing half
40 Closure mechanism
41 Tab
42-43 Useful surface
44 Cavity
45 Lifejacket
46-47 Attachment member
48 Sealing mechanism
49-50 Eye
51 Basic structure
52 Slot
53 Cutout
54 Outer side
55 Slot
56 Visible element
57 Fixing member
58-61 Side element
62 Main side element
63-64 Pivot bearing pin
65 Transverse yoke
66-67 Upholstery element
68-69 Side element
70 Main side element
71 Upholstery element
72 Spring device
73-74 Spring element

The invention claimed is:

1. An aircraft passenger seat comprising a legrest having a distinct device comprising a housing having a first and a second housing half as integral components of the basic structure of the legrest, wherein the two housing halves are pivotably movably connected to one another and comprise a rigid metal, a rigid plastic or combinations thereof, wherein the housing is designed in such a way that a lifejacket for an aircraft passenger can be stowed therein, wherein the device is arranged on a basic structure of the legrest, wherein the first housing half is subjected to a spring force of a spring device with respect to the second housing half, with the result that the first housing half can be moved from an open position relative to the second housing half toward a closed position relative to the second housing half.

2. The aircraft passenger seat as claimed in claim 1, wherein the two housing halves are non-detachably connected to one another.

3. The aircraft passenger seat as claimed in claim 1, wherein the spring device has two spring elements.

4. The aircraft passenger seat as claimed in claim 1, wherein each housing half has a main side element, wherein side elements protruding transversely in relation thereto are present on each of the main side elements, wherein two side elements of one housing half are spaced apart from one another and are situated opposite one another, wherein a spacing between the two spaced-apart and oppositely situated side elements of a first one of the housing halves is greater than a spacing between the two spaced-apart and oppositely situated side elements of a second one of the housing halves, such that the side elements of the first and the second housing half overlap in the closed position of the first housing half.

5. The aircraft passenger seat as claimed in claim 1, wherein the device has a closure mechanism that fixes the two housing halves in place in relation to one another in the closed position, wherein the closure mechanism comprises a pulling element, wherein the closure mechanism is designed in such a way that, by pulling on the pulling element, parts of the closure mechanism are moved in such a way that the housing halves are detached from one another in the region of the closure mechanism.

6. The aircraft passenger seat as claimed in claim 4, wherein the main side element of the second housing half is an integral component of the basic structure of the legrest.

7. The aircraft passenger seat as claimed in claim 1, wherein the device is designed in such a way that, in the closed position of the first housing half, the spring force of the spring device urges the first housing half toward an open position of the first housing half relative to the second housing half.

8. The aircraft passenger seat as claimed in claim 1, wherein the device is designed in such a way that, in the closed position of the first housing half, the spring force of the spring device urges the first housing half toward the closed position of the first housing half relative to the second housing half, with the result that the spring force of the spring device counteracts a movement force to be applied in order to move the first housing half from the closed position into an open position relative to the second housing half.

9. The aircraft passenger seat as claimed in claim 1, wherein the device is designed in such a way that, in an open position of the first housing half, the spring force of the spring device urges the first housing half toward the closed position of the first housing half relative to the second housing half.

10. The aircraft passenger seat as claimed in claim 1, wherein the device is designed in such a way that the spring force of the spring device urges the first housing half from a second open position relative to the second housing half toward the closed position of the first housing half into a first open position.

11. The aircraft passenger seat as claimed in claim 1, wherein the device is designed in such a way that the spring device is designed in such a way that the first housing half can be moved from an open position toward the closed position by means of the spring force, wherein the first housing half cannot be moved into the closed position from an open position by means of the spring force of the spring device.

12. A seat row having at least two aircraft passenger seats as claimed in claim 1.

13. An aircraft having an aircraft passenger seat as claimed in claim 1.

14. An aircraft having a seat row as claimed in claim 12.

* * * * *